US010750600B2

(12) United States Patent
Ahmad et al.

(10) Patent No.: US 10,750,600 B2
(45) Date of Patent: Aug. 18, 2020

(54) LIGHTING CONTROL NETWORK AND ASSOCIATED METHOD

(71) Applicant: Dialight Corporation, Farmingdale, NJ (US)

(72) Inventors: Rizwan Ahmad, Edison, NJ (US); John Herbert Sondericker, III, Colorado Springs, CO (US); Eman Koosha, Manalapan, NJ (US); Katayoun Sohrabi, Red Bank, NJ (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 16/454,819

(22) Filed: Jun. 27, 2019

(65) Prior Publication Data

US 2020/0008283 A1    Jan. 2, 2020

Related U.S. Application Data

(60) Provisional application No. 62/691,111, filed on Jun. 28, 2018.

(51) Int. Cl.
*H04B 1/20* (2006.01)
*G08B 5/22* (2006.01)
*H05B 47/19* (2020.01)
*H04B 10/116* (2013.01)
*F21S 9/02* (2006.01)
*F21Y 115/10* (2016.01)

(52) U.S. Cl.
CPC ........... *H05B 47/19* (2020.01); *H04B 10/116* (2013.01); *F21S 9/022* (2013.01); *F21Y 2115/10* (2016.08)

(58) Field of Classification Search
CPC ............ H05B 33/0815; H05B 33/0818; H05B 41/2828; H05B 41/3921; H05B 41/3927; H05B 41/28; H05B 37/029; H05B 33/0803; H05B 37/0254; H05B 37/02; G08C 23/04; G08C 2201/40; H04Q 9/00; G07C 9/00103; G07C 9/00142; G07C 9/00309; G07C 2009/00793; G07C 2209/63; G07C 9/00111; G08B 5/221; G06Q 10/02; C08B 31/12; G06F 3/0489; G06F 13/225; B60R 25/24; B60R 25/04
See application file for complete search history.

(56) References Cited

U.S. PATENT DOCUMENTS 6,879,263 B2 * 4/2005 Pederson ............. B60Q 1/2611
                                                  340/815.45
2008/0317475 A1 * 12/2008 Pederson ........... H04B 10/1143
                                                  398/135
2009/0184837 A1   7/2009 De Prycker et al.
(Continued)

OTHER PUBLICATIONS

International Search Report and Written Opinion of corresponding PCT Application No. PCT/US19/039542, dated Nov. 1, 2019, 9 pages.

*Primary Examiner* — Minh D A

(57) ABSTRACT

The present disclosure is directed to examples of a lighting data network. In one embodiment, the lighting data network includes a first luminaire, comprising a first wireless communication interface to receive data from a machine and a second luminaire, comprising a second wireless communication interface to receive the data from the first luminaire and a third communication interface to transmit the data to a third party control system.

19 Claims, 5 Drawing Sheets

(56) References Cited

U.S. PATENT DOCUMENTS

| | | |
|---|---|---|
| 2011/0288658 A1 | 11/2011 | Walters et al. |
| 2012/0026726 A1* | 2/2012 | Recker .................... F21S 9/037 362/157 |
| 2012/0086345 A1* | 4/2012 | Tran ................... H05B 33/0845 315/158 |
| 2015/0008842 A1 | 1/2015 | Harbers et al. |
| 2015/0042240 A1 | 2/2015 | Aggarwal et al. |
| 2015/0256623 A1 | 9/2015 | Ryhorchuk et al. |
| 2016/0345415 A1 | 11/2016 | Harbers |
| 2017/0135174 A1 | 5/2017 | Aliakseyeu et al. |

* cited by examiner

LIGHTING CONTROL NETWORK AND ASSOCIATED METHOD

CROSS REFERENCE TO RELATED APPLICATIONS

This application claims priority under 35 U.S.C. § 119(e) to U.S. provisional patent application Ser. No. 62/691,111, filed on Jun. 28, 2018, which is hereby incorporated by reference in its entirety.

BACKGROUND

Industry today relies on the transmission of data. Data is continuously transmitted for monitoring, automation control, and the like. Typically, data can be transmitted over wired and wireless networks that are deployed for transmitting data. For example, fiber optics networks and wireless networks with routers and gateways may be deployed to build a communication network. The cost to deploy these networks can be very expensive.

SUMMARY

In one embodiment, the present disclosure provides a lighting data network. In one embodiment, the lighting data network comprises a first luminaire, comprising a first wireless communication interface to receive data from a machine and a second luminaire, comprising a second wireless communication interface to receive the data from the first luminaire and a third communication interface to transmit the data to a third party control system.

In one embodiment, the present disclosure provides a method for processing machine data via a light node in a lighting network. In one embodiment, the method comprises receiving, by a processor of a light node in a lighting network, data from a machine, determining, by the processor, whether the data is to be processed locally or remotely by a third party control system, and transmitting, by the processor, the data to the third party control system when the data is to be processed remotely by the third party control system.

In one embodiment, the present disclosure provides a lighting system. In one embodiment, the lighting system comprises at least one machine to transmit or receive data, a lighting network to transport the data, wherein the lighting network comprises a plurality of lighting nodes, wherein each one of the plurality of lighting nodes comprises a wireless communication interface, and a third party control system to receive the data or transmit the data to the machine via the lighting network.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

The present disclosure provides a lighting data network that can transmit data between machines and a third party control system of the machines. As noted above, industry today relies on the transmission of data. Data is continuously transmitted for monitoring, automation control, and the like. Typically, data can be transmitted over wired and wireless networks that are deployed for transmitting data. For example, fiber optics networks and wireless networks with routers and gateways may be deployed to build a communication network. The cost to deploy these networks can be very expensive.

However, all facilities use lights to illuminate the facilities. Thus, using the lights inside of a facility to transport data may reduce the overall costs for implementing a separate communication network to transmit the data.

Examples of the present disclosure are concerned with a lighting control network which serves as a networked device proxy for industrial equipment, connecting this equipment via the lighting network to a supervisory control system. Examples of the present disclosure are concerned with collecting data (including non-lighting related data) from the connected devices, backhauling the non-lighting related data across the lighting network, and delivering the non-lighting related data via supported industry standard automation protocol to a supervisory control system. Through this mechanism the lighting system becomes a network proxy for the representation and access to virtual machines or sensor devices.

For example, the present disclosure provides light nodes or luminaires that are sufficient to illuminate a manufacturing facility, but modified to include communication interfaces to transmit data between the machines in the facility and the third party control system that controls the facility. In addition, the light nodes in the lighting network can be used to communicate information based on the machine data. For example, a light node located over a machine may process the data received from the machine and activate a particular lighting pattern based on the data. In addition, the third party control system may transmit control signals via the lighting network to control operation of a particular machine. Thus, significant cost reductions can be realized by using the lights in the facility or location to transport data instead of a separate data network.

Figure 1:
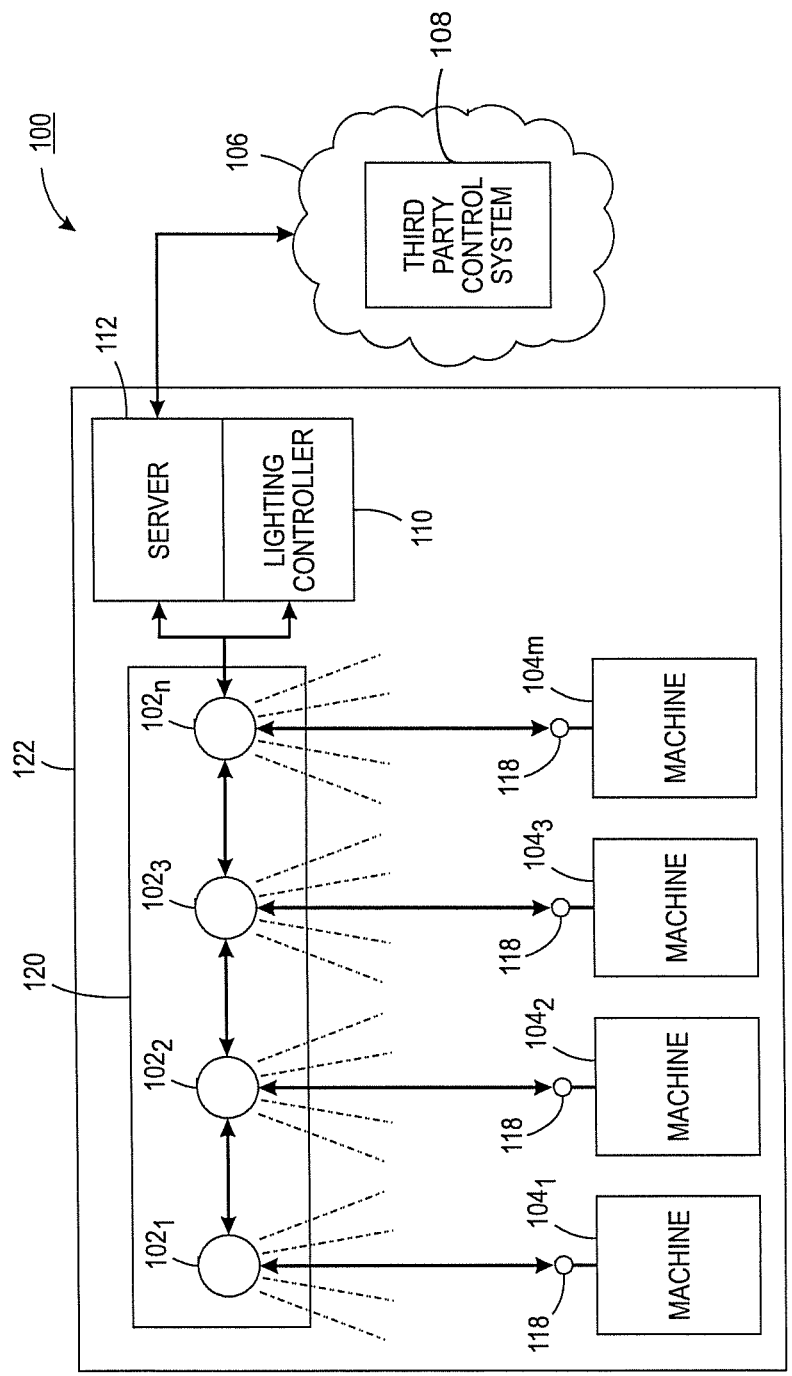
FIG. 1 depicts a block diagram of one embodiment of a lighting system of the present disclosure.

FIG. 1 illustrates an example of a lighting system 100. In one embodiment, the lighting system 100 may include a lighting network 120, one or more machines $104_1$-$104_m$ (herein also referred to individually as a machine 104 or collectively as machines 104), and a third party control system 108.

In one example, lighting network 120 and the machines 104 may be at a location 122. The location 122 may be a building, a factory, a plant, a fabrication center, a mine, or any other type of environment. The third party control system 108 may be located remotely from the location 122. The third party control system 108 may be located in an Internet protocol (IP) network 106. In one example, the third party control system 108 may be an automated system or server that can remotely monitor and control the machines 104. For example, the third party control system 108 may be remotely located at a headquarters or network operation center of a company that manages, controls, or owns the machines 104.

Although a single third party control system 108 is illustrated in FIG. 1, it should be noted that there may be multiple third party control systems 108. For example, different third party control systems may control different machines 104 in the location 122. The third party control systems may be networked together via the lighting network 120 and the IP network 106.

In one embodiment, the lighting network 120 may include a plurality of luminaires or light nodes $102_1$-$102_n$ (herein also referred to individually as a light node 102 or collectively as light nodes 102). The lighting system 100 may also include a server 112 and a lighting controller 110. The lighting controller 110 may be used to control lighting operations of the light nodes 102. For example, the lighting controller 110 may monitor operation of the light nodes 102, control different zones of the light nodes 102, turn the light nodes 102 on and off, change an illumination level of the light nodes 102, and the like.

In one example, the server 112 may be a computer that can serve as a gateway to the IP network 106. Details of the server 112 are discussed in further details below.

In one example, any of the machines 104 may be a device or an electronically operated machine. For example, any of the machines 104 may be a computing device, a robotic device, a conveyor, a processing device (e.g., a reactor, a heater, an etching machine, and so forth), a molding machine, and the like. In other words, any of the machines 104 may be any type of device or machine that can be used for manufacturing or operation of a facility or factory.

In one example, ant of the machines 104 may include a wireless transceiver 118. The wireless transceiver 118 may be able to transmit data or receive data. The light nodes 102 may include communication interfaces (as discussed below and illustrated in FIGS. 2 and 3) to communicate with the machines 104 via the wireless transceiver 118. The machines 104 may be represented as virtual devices across the lighting network 120, and may therefore be proxied. In other words, the third party control system 108 may make the machines 104 appear as if they are connected to the third party control system 108 in the IP network 106 locally. In addition, the machines 104 may support an Ethernet/IP, MODBUS, or other networks, when in fact they are connected to a system that makes the machines appear that way. For example, a machine sensor may "appear" to be on an Ethernet/IP network because the machine sensor is proxied by the third party control system 108.

In other words, the present disclosure provides a lighting control system that contains a connection to a third party machine or sensor devices and which transports the data across the lighting network 120 such that the machines 104 appear as virtual devices behind a network proxy, offering communication through the proxy to the third party control system 108. The machines 104 may be third party machines that are manufactured by a third party and are not specifically designed to be compatible with the lighting system 100. The third party machines may establish a proprietary, logic level, or network connection to a foreign system (e.g., the lighting system 100).

Thus, the structure of the system implements a lighting system 100, which functions as a device proxy that connects third party machines and sensors to a third party control system through the lighting network 120. In this paradigm the lighting system 100 is a stand-alone transport mechanism that moves the data across the location 122 with a transport that is ubiquitous and convenient.

In one example, data associated with a respective machine 104, or machine data, may be transmitted to a light node 102. In one example, each machine 104 may be associated with a light node 102. In one example a group of machines may be associated with a light node 102. For example, a light node $102_1$ may be located over the machine $104_1$ and associated with the machine $104_1$. The light node $102_2$ may be located over the machine $104_2$ and associated with the machine $104_2$, and so forth.

The data may then be transported across the lighting network 120 and delivered to the third party control system 108. In one example, the server 112 may be a connectivity adapter that is used to convert the data into an industry standard protocol used by the third party control system 108. Examples of industry standard protocols may include Ethernet/Internet protocol (IP), MODBUS, PROFINET, BACNET, CoAP, and the like.

In one example, the data from the machine 104 may include machine identification information (e.g., an IP address associated with the machine, a type of machine (e.g., machine name, model number, etc.), machine location (e.g., a geographic location, a building number, and the like), operational data (e.g., running time, throughput, parameter values, error logs, and the like), status information (e.g., operational, down for maintenance, error status, and the like), or any other type of machine data). As discussed in further details below, the data may then be processed locally by a receiving light node 102 or may be transmitted to the third party control system 108 to be processed remotely.

Similarly, the third party control system 108 may send data or control signals over the lighting network 120 to one of the machines 104. The data may include update information for firmware or other software on the machine 104, updated setting values for a particular operating parameter, and the like. The control signal may include a power on or off signal, a manual control signal, a signal to change operation of the machine 104, and the like. The operation of the machines 104 or a value of an operation parameter may then be modified in accordance with the control signal.

In one example, the data may be transported across the light nodes 102 based on any one of a variety of different communication technologies and interfaces. For example, the light nodes 102 may use wireless radio, a wired network connection, visible light communication (e.g., LiFi, or VLC), or any other method. The lighting network 120 may operate at either high or low transfer rates.

Figure 2:
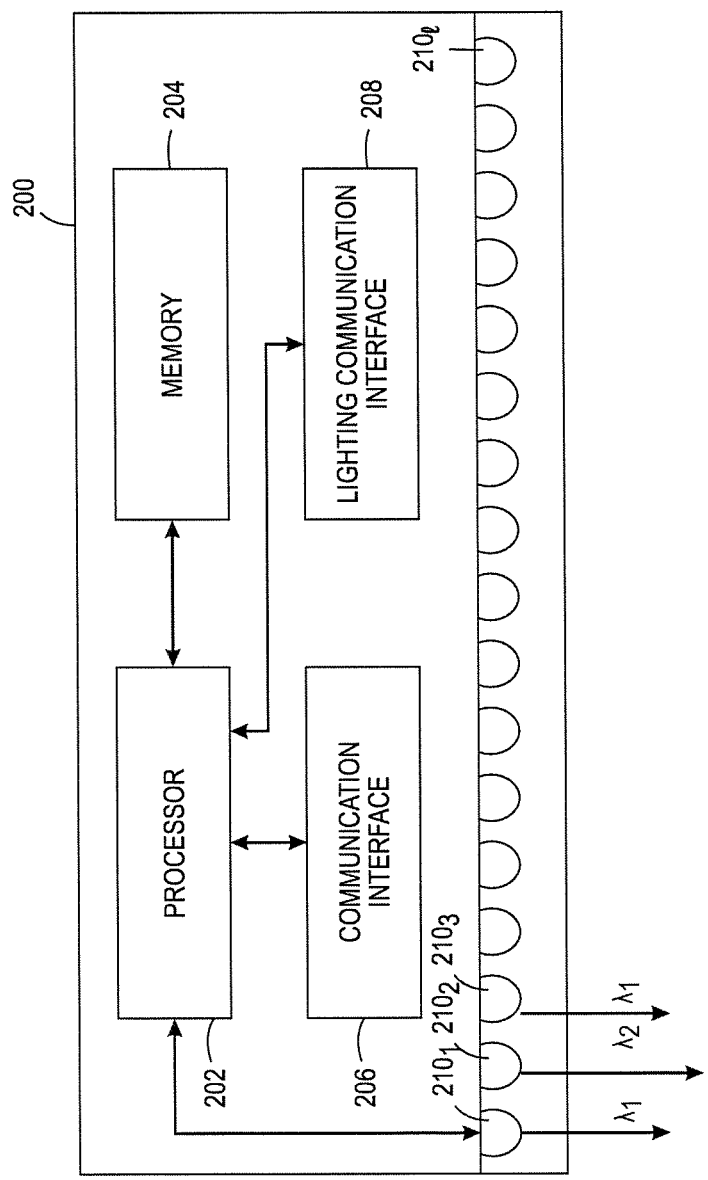
FIG. 2 depicts a block diagram of one embodiment of an example of a first luminaire in the lighting system of the present disclosure.

FIG. 2 illustrates an example of a light node 200. The light node 200 may be one of the light nodes 102 in the lighting network 120 illustrated in FIG. 1. In one example, the light node 200 may include a processor 202, a memory 204, a communication interface 206, a lighting communication interface 208, and a plurality of light emitting diodes (LEDs) $210_1$-$210_l$ (hereinafter also referred to individually as an LED 210 or collectively as LEDs 210).

In one embodiment, the processor 202 may be communicatively coupled to the memory 204, the communication interface 206, the lighting communication interface 208, and the LEDs 210. The processor 202 may receive, transmit, or process information or data that arrives at the communication interface 206 or the lighting communication interface 208. The processor 202 may also control operation of the LEDs 210.

In one example, the memory 204 may store settings for operation of the light node 200. In one example, the memory 204 may store thresholds or rules to determine if data received from a machine 104 should be processed locally or remotely. For example, the rules may include, if-then rules, scenarios, and the like specifying when the data should be processed locally. For example, if a temperature of a machine is over a threshold, a rule may generate an off signal to turn off the machine 104, or if the data indicates that a maintenance level is about to be reached, a rule may turn off the machine 104 and notify a technician for maintenance, and so forth.

In other examples, if the data is not found in the rules, then the data may be processed remotely by the third party control system 108. For example, the data may include a variety of different operational parameters that can be tracked or monitored by the third party control system 108.

In one example, the communication interface 206 may be a wireless communication interface that can use any type of wireless communication protocol. For example, the wireless communication interface 206 may communicate with the wireless transceiver 118 of the machine 104 via a local area network, a WiFi protocol, a Bluetooth or low energy communication protocol, and the like.

In one example, the communication interface 206 may be a wired communication interface. For example, the communication interface 206 may be a wired interface to connect to the third party control system 108 via a wired communication protocol such as Ethernet/IP, BACNET, or MODBUS.

In one example, the lighting communication interface 208 may be a dedicated communication path to transmit lighting controls to the light nodes 102 across the lighting network 120. For example, the lighting controller 110 may transmit lighting control signals to the light nodes via the lighting communication interface 208.

Separating the communication interface for the data from the machines 104 and the lighting control signals from the lighting controller 110 may have advantages. For example, the communication interface 206 may transmit data at a very high speed. Fast cyclic times for reading or writing data locally may be separated from the lighting network and, therefore, may not impact the lighting network's throughput. Another advantage may be that the communication interface 206 may use a proprietary protocol used by the machines 104 and the third party control system 108 that is not used elsewhere in the lighting network 120. Thus, the light node 102 with its dual communication interface may then act as a network translator or bridge, which may facilitate easy connection to the third party machine or sensor device even though the communication interface is inherently configured to use a different protocol than is used in the lighting network 120.

In one embodiment, the LEDs 210 may emit light to illuminate an area below the light node 102 in the location 122. In other words, the LEDs 210 provide bright light to illuminate a room and are not low light output LEDs found in signal or indicator lights.

In one example, the LEDS 210 may include different LEDs that emit different wavelengths of light. For example, the LEDs $210_1$ and $210_3$ may emit visible light at a first wavelength ($\lambda_1$). The LED $210_2$ may emit light at a second wavelength ($\lambda_2$) that may not be visible. The second wavelength of light may be used to transmit the data via LiFi.

In one embodiment, all of the light nodes 102 may be similar to the light node 200. In such an example, the server 112 may also serve as a gateway to a wide area network that can reach the IP network 106. Thus, one of the light nodes 102 (e.g., a light node adjacent to or closest to the server 112) may transmit data from the machines 104 to the server 112. The server 112 may then transmit the data to the third party control system 108 via the IP network 106.

It should be noted that the light node 200 has been simplified for ease of explanation. The light node 200 may include additional input/output interfaces that are not shown. For example, the additional input/output interfaces may include digital, analog, or network interfaces that are connected to an output of the machines 104. Examples of output interfaces on the machine 104 may include logic level, analog level, universal serial bus (USB), DIN connections, a terminal block, wireless, and the like.

Figure 3:
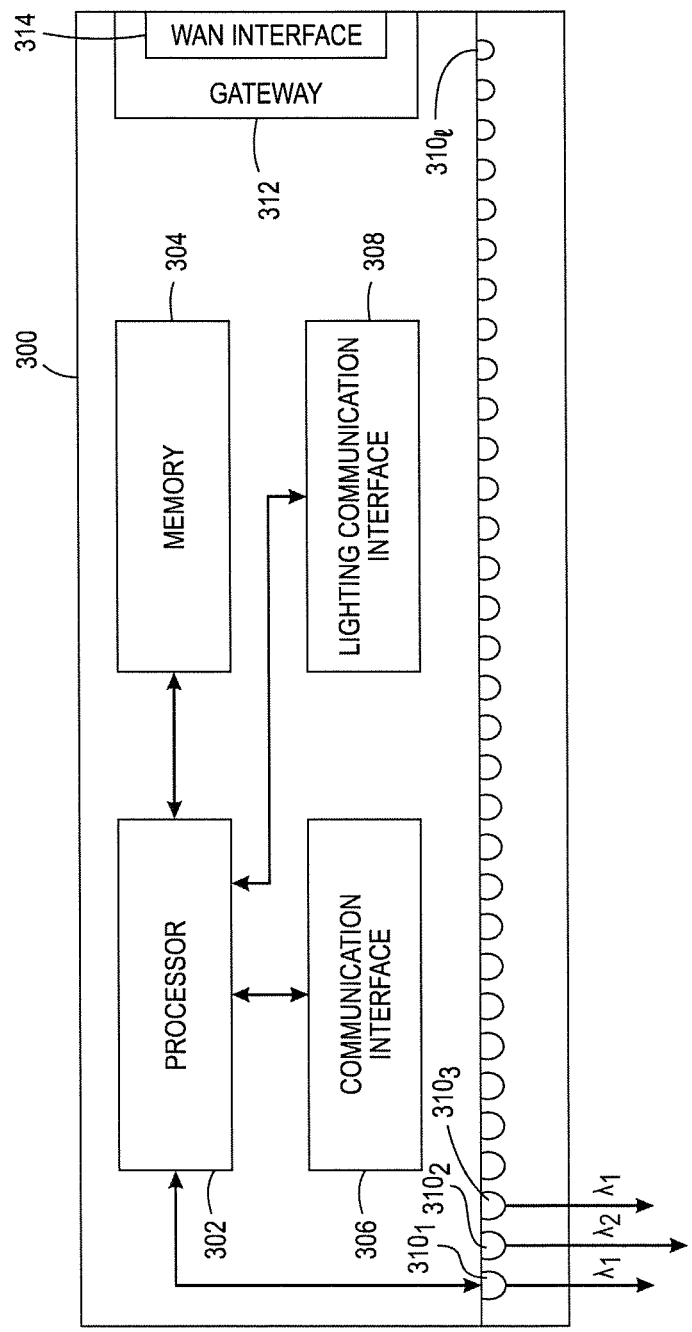
FIG. 3 depicts a block diagram of one embodiment of an example of a second luminaire in the lighting system of the present disclosure.

FIG. 3 illustrates an example of a light node 300. The light node 300 may be one of the light nodes 102 in the lighting network 120. For example, the light node 300 may be a last light node 102n in the light network 120. In one example, the light node 300 may include a processor 302, a memory 304, a communication interface 306, a lighting communication interface 308, a plurality of light emitting diodes (LEDs) $310_1$-$310_i$ (hereinafter also referred to individually as an LED 310 or collectively as LEDs 310), a gateway 312, and a wide area network (WAN) interface 314.

In one embodiment, the processor 302 may be communicatively coupled to the memory 304, the communication interface 306, the lighting communication interface 308, the LEDs 310, and the gateway 312. The processor 302 may receive, transmit, or process information or data that arrives at the communication interface 306, the lighting communication interface 308, or the gateway 312. The processor 302 may also control operation of the LEDs 310.

In one example, the memory 304 may store settings for operation of the light node 300. In one example, the memory 304 may store thresholds or rules to determine if data received from a machine 104 should be processed locally or remotely, as described above.

In one example, the communication interface 306 may be a wireless communication interface that can use any type of wireless communication protocol. For example, the wireless communication interface 306 may communicate with the wireless transceiver 118 of the machine 104 via a local area network, a WiFi protocol, a Bluetooth or low energy communication protocol, and the like.

In one example, the lighting communication interface 308 may implement a dedicated communication path to transmit lighting controls to the light nodes 102 across the lighting network 120. For example, the lighting controller 110 may transmit lighting control signals to the light nodes via the lighting communication interface 308.

As noted above, separating the communication interface for the data from the machines 104 and the lighting control signals from the lighting controller 110 may have advantages. For example, the wireless interface 306 may transmit data at a very high speed. Fast cyclic times for reading or writing data locally may be separated from the lighting network and, therefore, may not impact the lighting network's throughput. Another advantage may be that the wireless interface 306 may use a proprietary protocol used by the machines 104 and the third party control system 108 that is not used elsewhere in the lighting network 120. Thus, the light node 102 with its dual communication interface may then act as a network translator or bridge, which may facilitate easy connection to the third party machine or sensor device even though the communication interface is inherently configured to use a different protocol than is used in the lighting network 120.

In one embodiment, the LEDs 310 may emit light to illuminate an area below the light node 102 in the location 122. In other words, the LEDs 310 provide bright light to illuminate a room and are not low light output LEDs found in signal or indicator lights.

In one example, the LEDS 310 may include different LEDs that emit different wavelengths of light. For example, the LEDs $310_1$ and $310_3$ may emit visible light at a first wavelength ($\lambda_1$). The LED $310_2$ may emit light at a second wavelength ($\lambda_2$) that may not be visible. The second wavelength of light may be used to transmit the data via LiFi.

In one embodiment, the last light node 102*n* may be the light node 300. Thus, the last light node 102*n* may provide a communication interface for a connection to the IP network 106 via the gateway 312 and the WAN interface 314. The WAN interface 314 may be a communication interface that provides a wired or wireless communication path. In such an example, the server 112 may provide translation of the data back to the last light node 102*n*, which may then transmit the data to the third party controls system 108 via a communication path between the WAN interface 114 and the IP network 106.

It should be noted that the light node 300 has been simplified for ease of explanation. The light node 300 may include additional input/output interfaces that are not shown. For example, the additional input/output interfaces may include digital, analog, or network interfaces that are connected to an output of the machines 104. Examples of output interfaces on the machine 104 may include logic level, analog level, universal serial bus (USB), DIN connections, a terminal block, wireless, and the like.

Figure 4:
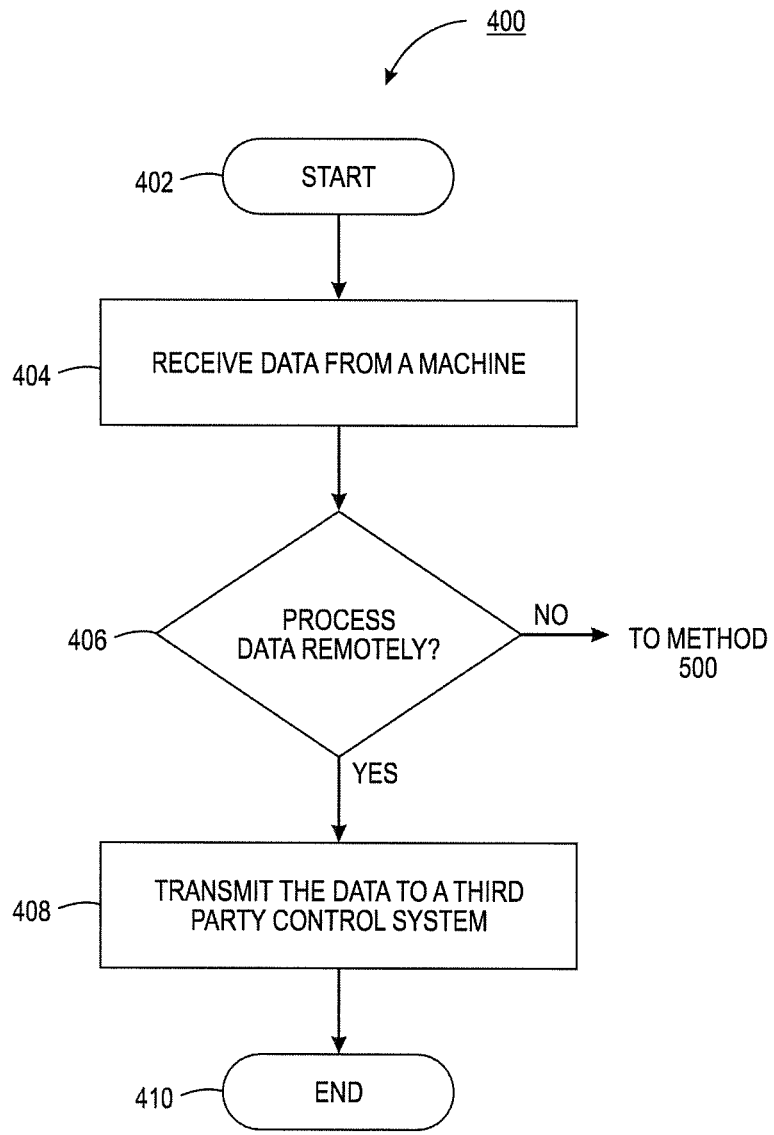
FIG. 4 depicts a flow diagram of an example method for processing machine data via a light node in a lighting network of the present disclosure.

FIG. 4 illustrates a flowchart of an example method 400 for processing machine data via a light node in a lighting network. The method 400 may be performed by a light node 102, 202, or 302 illustrated in FIGS. 1-3.

The method 400 beings at block 402. At block 404, the method 400 receives data from a machine. For example, the data may be machine data that includes operational data or location data associated with the machine.

At block 406, the method 400 determines whether the data is to be processed locally or remotely by a third party control system. For example, the processor in the light node may analyze the data to determine if the data should be processed locally or remotely. The data may be compared to rules or thresholds that are stored in memory at the light node that indicate whether the data should be processed locally or remotely.

In one example, the data may include an indicator that indicates whether the data should be processed locally or remotely. For example, the machine may insert a bit in a header of the data that indicates local processing or remote processing. As a result, the light node may simply analyze the data to look for the bit associated with either a local processing instruction or a remote processing instruction.

If the answer to block 406 is no, the method 400 may proceed to the method 500 illustrated in FIG. 5, and discussed below. If the answer to block 406 is yes, then the method 400 may proceed to block 408.

At block 408, the method 400 transmits the data to the third party control system when the data is to be processed remotely by the third party control system. For example, the third party control system may monitor the particular machine based on the operational data and the location data. Based on the monitoring, the third party control system may determine if control signals should be sent to the machine.

If a control signal should be generated, the third party control system may generate the control signal in response to the data. For example, the data may indicate that the machine is about to malfunction, is overheating, has an incorrect value for a control parameter, and the like. The control signal may be designed to improve the operation of the machine, correct the operation of the machine, resolve an error status of the machine, and the like. The control signal may be designed to change the operation of the machine or change a value of a control parameter of the machine, and so forth.

The third party control system may send the control signal to the machine via the lighting network. The lighting network may transmit the control signal from light node to light node until the control signal is transmitted to the appropriate machine. The machine may then receive the control signal and change operation or a value of a control parameter in accordance with the control signal. The method 400 ends at block 410.

Figure 5:
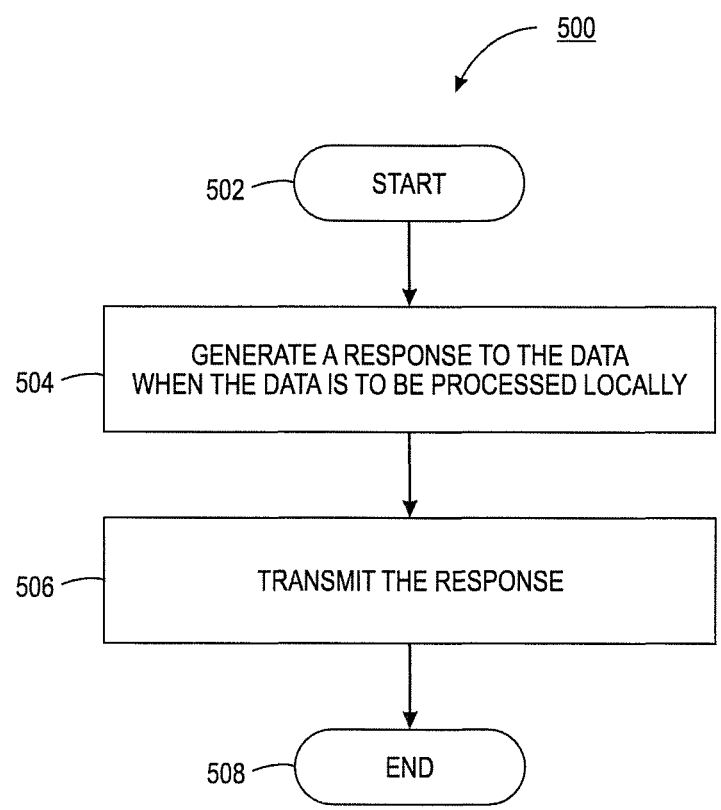
FIG. 5 depicts a flow diagram of a method for operating a light node based on machine data of the present disclosure.

FIG. 5 illustrates a flowchart of one embodiment of a method 500 for operating a light node based on machine data. For example, in the method 400, the light node may determine that the data should be processed locally. In response, the method 500 may be executed. The method 400 may be performed by a light node 102, 202, or 302 illustrated in FIGS. 1-3.

The method 500 begins at block 502. At block 504, the method 500 generates a response to the data when the data is to be processed locally. In one embodiment, the response may be data or a control signal that is generated and transmitted back to the machine. In one embodiment, the response may be a visual signal that is transmitted visually by the light node.

At block 506, the method 500 may transmit the response. If the response comprises data or a control signal, the response may be transmitted back to the machine. For example, some data may be processed locally and the light node may send a control signal in response to the data. For example, if the data indicates an error status, the light node may generate a power down signal to shut off the machine.

In another example, the machine may request data associated with another machine. The light node may communicate with the other machine directly or indirectly through other light nodes to obtain the data. The light node may then transmit the data in the response back to the machine. For example, the machine may be along an assembly line and waiting for a product. The machine may query the light node regarding data of a machine that is upstream in the assembly line. The light node may query the upstream machine to receive data indicating that the upstream machine is down for maintenance. The light node may then transmit the response that indicates that the upstream machine is down for maintenance to the querying machine.

In one embodiment, the response may be visual. For example, the response may be a visual lighting pattern based on the data. The data may indicate a particular status or error code. In response, the light node may activate a lighting pattern that is indicative of a status of the machine based on the data that is processed. For example, the light node may begin blinking when the status is an error status. Thus, a technician may see the light node blinking and check the error on the machine. In another example, the light node may blink rapidly when communication is lost with the machine. For example, the machine may be experiencing a network error or a communication interface error.

In another example, the light node may blink in a particular number pattern. Each number pattern may be associated with a predefined error. For example, two consecutive blinks, a pause, two consecutive blinks, a pause, and so forth may be indicative of a first error. Three consecutive blinks, a pause, three consecutive blinks, a pause, and so forth may be indicative of a second error. Three consecutive blinks, four consecutive blinks, and so forth, may be associated with a third error and a fourth error.

In one example, the data may be associated with a safety issue. For example, the machine may be on fire or about to explode. The light node may communicate the status to other light nodes in the lighting network. A subset of the light nodes may be activated to illuminate an evacuation route in response to the safety status. For example, the light nodes may illuminate a path that allows exiting employees to avoid walking by the machine with the safety issue. The employees may then follow the lit path to evacuate the facility to safety.

In another example, special lighting devices may be illuminated that are application specific. For example special light devices may be part of the lighting network and intended for signaling based on specific criteria (e.g., emergency egress lighting, emergency exit, signs, and the like). At block 510, the method 500 ends.

It should be noted that steps, operations, or blocks in FIGS. 4 and 5 that recite a determining operation, or involve a decision, do not necessarily require that both branches of the determining operation be practiced. In other words, one of the branches of the determining operation can be deemed as an optional step. Furthermore, operations, steps, or blocks of the above described methods can be combined, separated, and/or performed in a different order from that described above, without departing from the example embodiments of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A lighting data network, comprising:
   a first luminaire, comprising a first wireless communication interface to receive data from a machine; and
   a second luminaire, comprising a second wireless communication interface to receive the data from the first luminaire and a third communication interface to transmit the data to a third party control system, wherein the first luminaire is to determine if the data is to be processed locally by the first luminaire or remotely by the third party control system, wherein when the data is to be processed locally, the first luminaire is to generate a response to the data or when the data is to be processed remotely, the first luminaire is to transmit the data to the second luminaire for transmission to the third party control system.

2. The lighting data network of claim 1, wherein the first luminaire and the second luminaire each comprise a lighting communication interface to receive and transmit lighting control signals.

3. The lighting data network of claim 1, wherein the first wireless communication interface and the second wireless communication interface comprise local area network interfaces.

4. The lighting data network of claim 1, wherein the first wireless communication interface and the second wireless communication interface comprise a dedicated wavelength to transmit the data, wherein the dedicated wavelength is different than the wavelength of light emitted to illuminate a location where the first luminaire and the second luminaire are located.

5. The lighting data network of claim 1, wherein the third communication interface comprises a gateway to a wide area network.

6. The lighting data network of claim 1, wherein the first wireless communication interface communicates in a communication protocol associated with the machine.

7. The lighting data network of claim 1, further comprising:
   a server in communication with the second luminaire and the third party control system, wherein the server translates the data into a communication protocol of the third party control system before transmitting the data to the third party control system.

8. The lighting data network of claim 1, further comprising:
   a plurality of additional luminaires positioned between the first luminaire and the second luminaire, wherein each one of the plurality of additional luminaires include a local communication interface and are associated with a respective machine.

9. The lighting data network of claim 1, wherein the data comprises operational data and location data associated with the machine.

10. A method, comprising:
    receiving, by a processor of a light node in a lighting network, data from a machine;
    determining, by the processor, whether the data is to be processed locally or remotely by a third party control system; and
    transmitting, by the processor, the data to the third party control system when the data is to be processed remotely by the third party control system or generating a response to the data by the processor of the light node when the data is to be processed locally.

11. The method of claim 10, further comprising:
    transmitting, by the processor, the response to the machine when the data is to be processed locally.

12. The method of claim 10, wherein the response comprises a lighting pattern of the light node based on the data to indicate a status of the machine and the response is transmitted visually by the lighting pattern.

13. The method of claim 10, further comprising:
    receiving, by the processor, a control signal from the third party control system in response to the data; and
    transmitting, by the processor, the control signal to the machine to change operation of the machine in accordance with the control signal.

14. The method of claim 10, wherein the data comprises a safety status of the machine and the light node communicates the data to other light nodes within the lighting network, wherein a subset of the other light nodes are activated to illuminate an evacuation route in response to the safety status.

15. A lighting system, comprising:
    at least one machine to transmit or receive data;
    a lighting network to transport the data, wherein the lighting network comprises a plurality of lighting nodes, wherein each one of the plurality of lighting nodes comprises a wireless communication interface, wherein a lighting node of the plurality of lighting nodes is associated with the at least one machine; and a third party control system to receive the data or transmit the data to the machine via the lighting network, wherein the lighting node is to determine if the data is to be processed locally by the lighting node or remotely by the third party control system, wherein when the data is to be processed locally, the lighting node is to generate a response to the data or when the data is to be processed remotely, the lighting node is to transmit the data to the third party control system.

16. The lighting system of claim 15, wherein each one of the lighting nodes comprises a lighting communication interface dedicated to receive or transmit lighting control signals from a lighting controller.

17. The lighting system of claim 15, wherein the at least one machine comprises a plurality of machines and each one of the plurality of machines is associated with one of the plurality of lighting nodes.

18. The lighting system of claim 15, wherein the data comprises operational data and location data associated with the at least one machine.

19. The lighting system of claim 15, wherein the third party control system is to send control signals to control operation of the at least one machine via the lighting network.

* * * * *